(12) United States Patent
Sasaki (10) Patent No.: US 7,046,294 B1
(45) Date of Patent: May 16, 2006

(54) ELECTRONIC STILL CAMERA WITH PRINTER

(75) Inventor: Hidemi Sasaki, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 737 days.

(21) Appl. No.: 09/598,333

(22) Filed: Jun. 21, 2000

(30) Foreign Application Priority Data

Jun. 22, 1999 (JP) ................................ 11-176101

(51) Int. Cl.
*H04N 5/225* (2006.01)
(52) U.S. Cl. .................... 348/372; 348/375; 348/207.2
(58) Field of Classification Search ........... 348/207.99, 348/207.1, 207.2, 372, 373, 374, 375, 220.1, 348/207.11; 358/1.6, 1.1, 296, 483, 503; 347/2, 86; 396/429
See application file for complete search history.

(56) References Cited

U.S. PATENT DOCUMENTS

| | | | | |
|---|---|---|---|---|
| 3,745,901 A | * | 7/1973 | Miyakawa et al. | 396/252 |
| 4,262,301 A | * | 4/1981 | Erlichman | 386/31 |
| 5,847,836 A | * | 12/1998 | Suzuki | 358/296 |
| 5,875,034 A | * | 2/1999 | Shintani et al. | 358/296 |
| 5,978,609 A | * | 11/1999 | Aoki | 396/429 |
| 6,149,256 A | * | 11/2000 | McIntyre et al. | 347/2 |
| 6,515,761 B1 | * | 2/2003 | Aoto et al. | 358/1.6 |

OTHER PUBLICATIONS

Kodak Digital Science, DC220 and DC260 Zoom Camera, User's Guide.*
Cover page of Publication No. WO99/53374, Oct. 21, 1999 (PCT/JP99/01918, filed Apr. 12, 1999).

* cited by examiner

*Primary Examiner*—Tuan Ho
(74) *Attorney, Agent, or Firm*—Sughrue Mion, PLLC (57) ABSTRACT

An electronic still camera has a camera section for photographing a subject as an electronic image through an image sensor and recording it as digital image data in a memory, and a printer section for printing the electronic image on an instant photo film sheet based on the digital image data. In a normal power mode, the camera section and the printer section are supplied from their specific power sources separately from each other. The power source for the camera section is a primary battery of AA type, whereas the power source for the printer section is constituted of four secondary batteries of AA type. When the printer power source has run down, the camera may be switched to a low power mode, wherein the printer section as well as the camera section is supplied from the camera power source. When the camera power source has run down, the camera section may be supplied from the printer power source, or one of the batteries used as the printer power source may be replaced with the used-up battery of the camera power source.

11 Claims, 9 Drawing Sheets

ELECTRONIC STILL CAMERA WITH PRINTER

BACKGROUND OF THE INVENTION

1. Field of the Invention

The present invention relates to an electronic still camera with a printer section for making a hard copy of an electronic image that is recorded as image data in a memory through the electronic still camera.

2. Background Arts

Electronic still cameras have recently been widely used that form an optical image of a subject on an image sensor through a taking lens, to convert the optical image into an electric signal, and record it as electronic image data in a memory. Some of the electronic still cameras are provided with an electronic viewfinder that displays moving images of the subject in the photographic field of the taking lens based on the electric signals from the image sensor. The electronic viewfinder is mostly made of an LCD panel.

It is also known in the art to incorporate a printer into the electronic still camera, for making a hard copy of the photographed image instantly on the basis of the image data. An example of electronic still camera with a printer section is one described in PCT/JP99/01918, wherein the printer section makes a hard copy of an image by exposing an instant film sheet through a linear optical printing head that is driven in accordance with image data of the image read out from a memory. The instant film sheet is processed by its own processing fluid that is automatically spread on the instant film sheet while it is squeezing out of the camera through a pair of film processing rollers in the same way as in a conventional instant camera.

Although the electronic still camera of this prior art makes it possible to get a hard copy of the photographed image with ease without bothering portability of the camera, since the printer section consumes a lot of electric power, the power source batteries run down in a shorter time compared to those electronic still cameras with no printer section. When the power source batteries have ran down, it is impossible to use a camera section of the electronic still camera of this prior art.

SUMMARY OF THE INVENTION

In view of the foregoing, an object of the present invention is to provide an electronic still camera with a printer incorporated therein, that is effective for avoiding using up the power source by the printer, and permits supplying electric power stably for a long time.

An electronic still camera according to the present invention comprises a camera section for photographing a subject as an electronic image and recording it as digital image data in a memory; a printer section for printing an image of the subject on a recording material based on the digital image data; a control section for controlling the camera section and the printer section; and a power source section, wherein the power source section comprises a first power source supplying the camera section and a second power source for supplying the printer section separately from each other in a normal condition of the camera.

Since the printer section is supplied from the second power source separately from the camera section, the camera section is not affected when the second power source has run down.

Because the printer section consumes a larger amount of electric power, it is preferable to use a larger capacity power source for the second power source, in comparison with the first power source. For the same reason, it is also preferable to use secondary batteries, such as lithium ion cells, for the second power source. By using batteries of compatible types, e.g. AA type batteries, for the second power source and the first power source, the batteries of the second power source may be used as spare batteries for the camera power source.

According to a still preferred embodiment, the electronic still camera is provided with a switching device for connecting the second power source to the camera section, and for connecting the first power source to the printer section. The switching device may be controlled depending upon input signals entered through external operation. It is also preferable to provide the electronic still camera with a device for checking respective voltages of the first and second power sources, and outputting a signal to the control section when the voltage of the first or the second power source goes below a respective lower limit. Thereby, the control section controls the switching device in response to the signal from the checking device so as to connect one of the power sources whose voltage is still above the lower limit to the camera section. In that case, the available power source is connected also to the printer section when the printer section must be activated.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
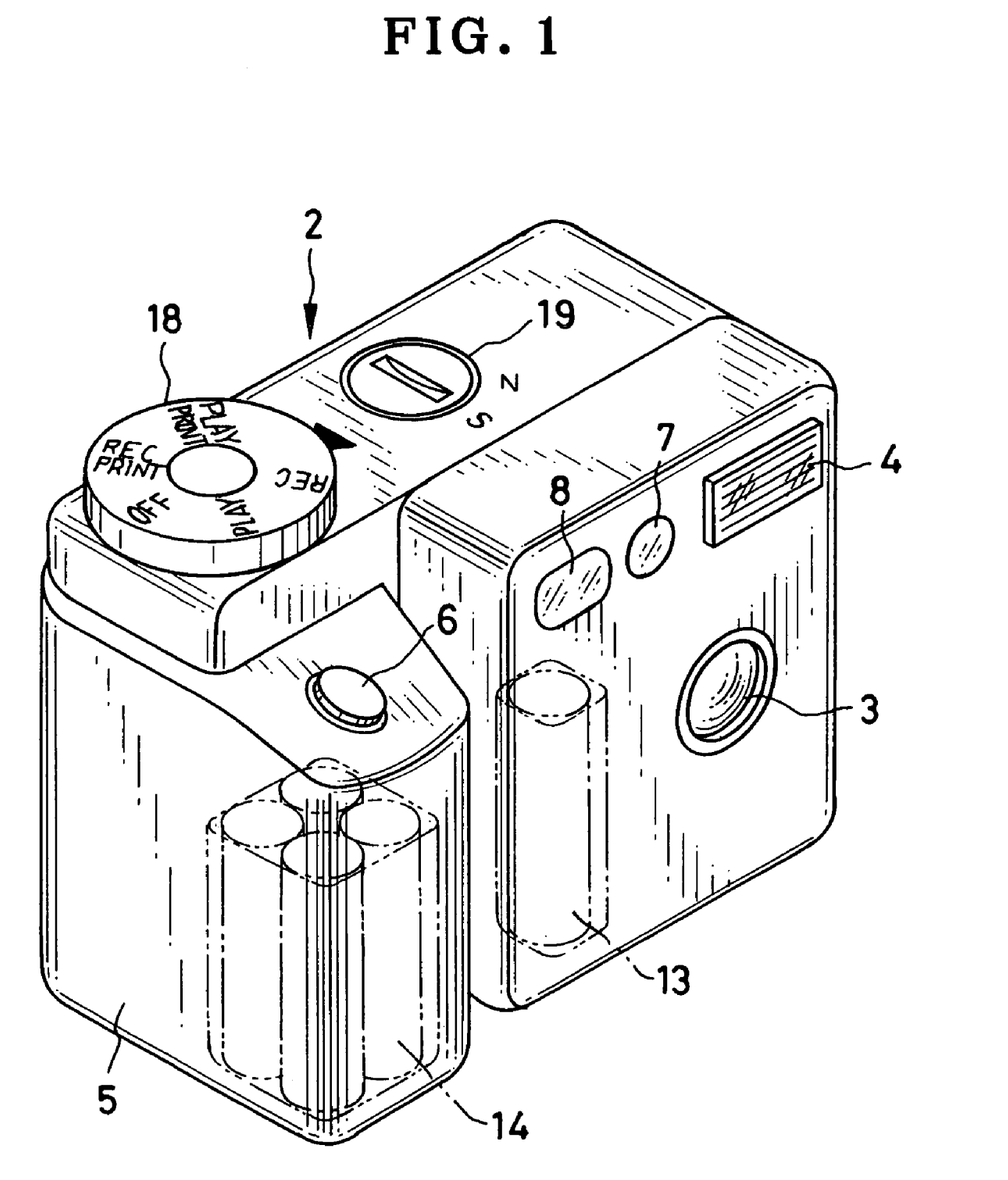
FIG. 1 is a front perspective view of an electronic still camera according to a preferred embodiment of the invention.
Figure 2:
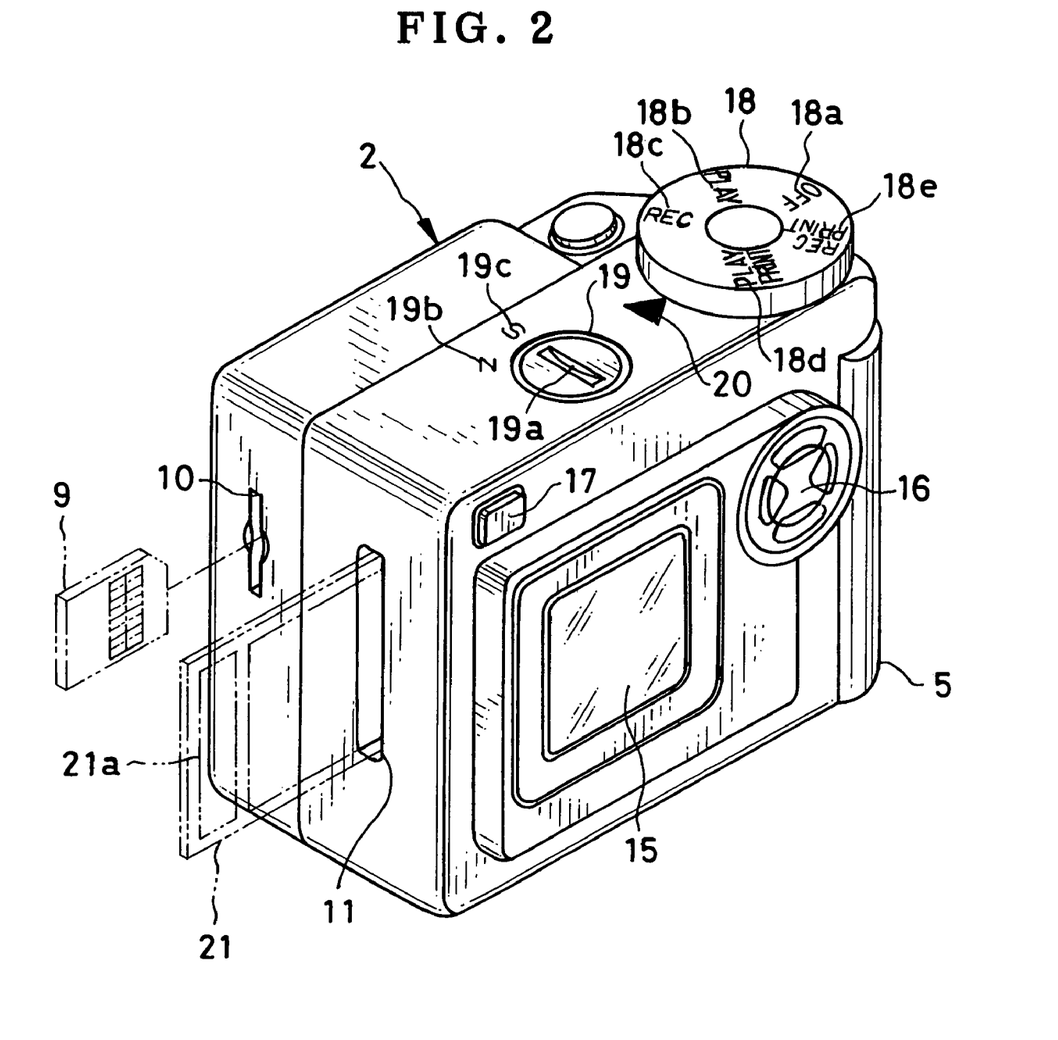
FIG. 2 is a rear perspective view of the electronic still camera of the embodiment.

An electronic still camera shown in FIGS. 1 and 2 has a camera section and a printer section which are incorporated into a body 2. The camera section photographs a subject as an electronic image and records it as digital image data, whereas the printer section prints an image of the subject on a sheet of conventional photographic instant film on the basis of the image data.

A camera lens 3 and a flash window 4 are disposed on a front side of the camera body 2. A shutter button 6 is disposed above a grip 5. Upon the shutter button 6 being pressed, a subject distance is measured through a light projection window 7 and a light receiving window 8, so the camera lens 3 is automatically focused on the subject at each photography.

As a power source for the camera section, a battery 13 is accommodated in the camera body 2 on the left side of the camera lens 3 in FIG. 1. Besides the battery 13, a plurality of batteries 14 are accommodated in the grip 14, which are used as a power source for the printer section. These batteries 13 and 14 are of AA size penlight type cells, but a primary battery, e.g. a lithium ion cell, is used for the camera power source 13, whereas secondary batteries, e.g. manganese cells, are used for the printer power source 14. Because the printer section consumes electric power more than the camera section, the printer power source 14 is provided with a larger capacity.

As shown in FIG. 2, a removable card type memory 9 may be put in a memory slot 10 that is formed on the opposite side from the grip 5, for storing the image data. A film ejection slot 11 is formed beside the memory slot 10, for ejecting the instant film sheet 21 after it is exposed by the printer section.

An LCD panel 15, a multi-operation button 16 and a print start button 17 are disposed on a rear side of the camera body 2, whereas a mode switching dial 18 and a power selection button 19 are disposed on a top side of the camera body 2. The LCD panel 15 works as an electronic viewfinder that displays moving images of subjects located in a photographic field of the camera lens 3 in a real time fashion. The multi-operation button 16 is used for digital-zooming, as well as many operations in various modes, including a recording mode, a playing mode and so forth. The print start button 17 is pressed to start printing an image displayed on the LCD panel 15 at that moment.

The mode switching dial 18 has indicia 18a, 18b, 18c, 18d and 18e thereon for indicating mode-options: "OFF" for a power-off mode, "PLAY" for the playing mode, "REC" for the recording mode, "PLAY-PRINT" for a playing-and-printing mode, and "REC-PRINT" for a recording-and-printing mode. One of these modes is selected by aligning a corresponding one of the indicia 18a to 18d with an index mark 20 that is provided on the top of the camera body 2 beside the mode switching dial 18.

The power selection button 19 is used for switching between a normal power mode and a low power mode. By aligning a slit 19a on the power selection button 19 with an indicia "N" 19b or an indicia "19c", the normal power mode or the low power mode is selected respectively. The low power mode is to be selected when the printer power source 14 runs down.

Figure 3:
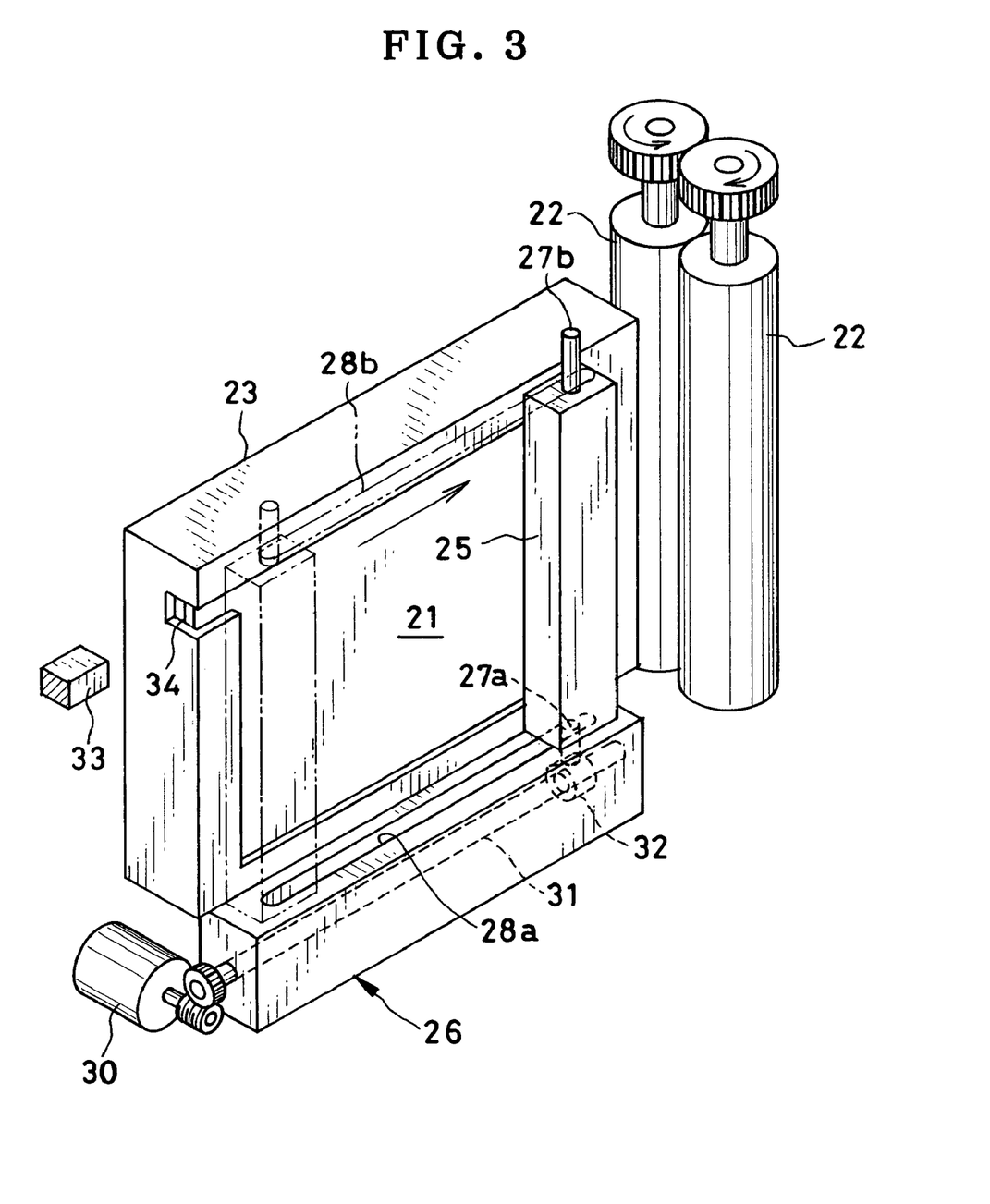
FIG. 3 is a perspective view of a printer section of the electronic still camera.

As shown in FIG. 3, the printer section is mainly constituted of an optical printing head 25, a head carrying mechanism 26, a pair of film processing rollers 22, and a claw member 33. A film pack 23 that contains a stack of instant film sheets 21 in a plastic case is loaded in the camera body 2, so the instant film sheet 21 is successively exposed by the printing head 25. The printing head 25 extends along a main scan direction that is perpendicular to an ejecting direction of the instant film sheet 21 that is indicated by an arrow in FIG. 3. An axle 27a or 27b formed on either end of the printing head 25 is inserted in a slot 28a or 28b respectively, such that the axles 27a and 27b may slide along the slots 28a and 28b. Because the slots 28a and 28b extend in a sub scan direction that is parallel to the film ejecting direction, the printing head 25 is movable in the sub scan direction.

The head carrying mechanism 26 is mainly constituted of a scanning motor 30, a lead screw 31 driven by the scanning motor 30, a movable member 32 mounted on the lead screw 31 to move along the lead screw 31 with the rotation of the lead screw 31. Since the axle 27a of the printing head 25 is secured to the movable member 32, the printing head 25 moves in the sub scan direction with the rotation of the scanning motor 30.

The scanning motor 30 is a bi-directional stepping motor. While moving from a first terminal position shown by phantom lines in FIG. 3 to a second terminal position shown by solid lines in response to forward rotation of the motor 30, the printing head 25 records a first color frame of a full-color image on the instant film sheet 21 line after line. A second color frame is recorded while the printing head 25 moves from the second terminal position to the first terminal position after printing the first color frame. A third color frame is recorded while the printing head 25 moves from the first terminal position to the second terminal position. Thus, the printing head 25 moves three times between the terminal positions to record the full-color image on the instant film sheet 21 in a color frame sequential fashion. This method is preferable to save the total printing time per one image.

The film processing rollers 22 are disposed behind the film ejection slot 11. After the full-color image is recorded on the instant film sheet 21, the claw member 33 is activated to push the instant film sheet 21 out of the film pack 23 toward the film processing rollers 22. Then, the instant film sheet 21 is nipped between the film processing rollers 22, and is fed out of the camera body 2 through the film ejection slot 11 by rotating the film processing rollers 22. While the instant film sheet 21 is squeezed through the film processing roller 22, a pod 21a (see FIG. 2) is ruptured, and processing fluid is spread over the film sheet 21. Thus, a positive image is developed on the instant film sheet 21 in a few minutes after the ejection. It is to be noted that the claw member 33 and the film processing rollers 22 may be driven through a mechanism that is used in a conventional instant camera such as disclosed in JPA 4-194832.

Figure 4:
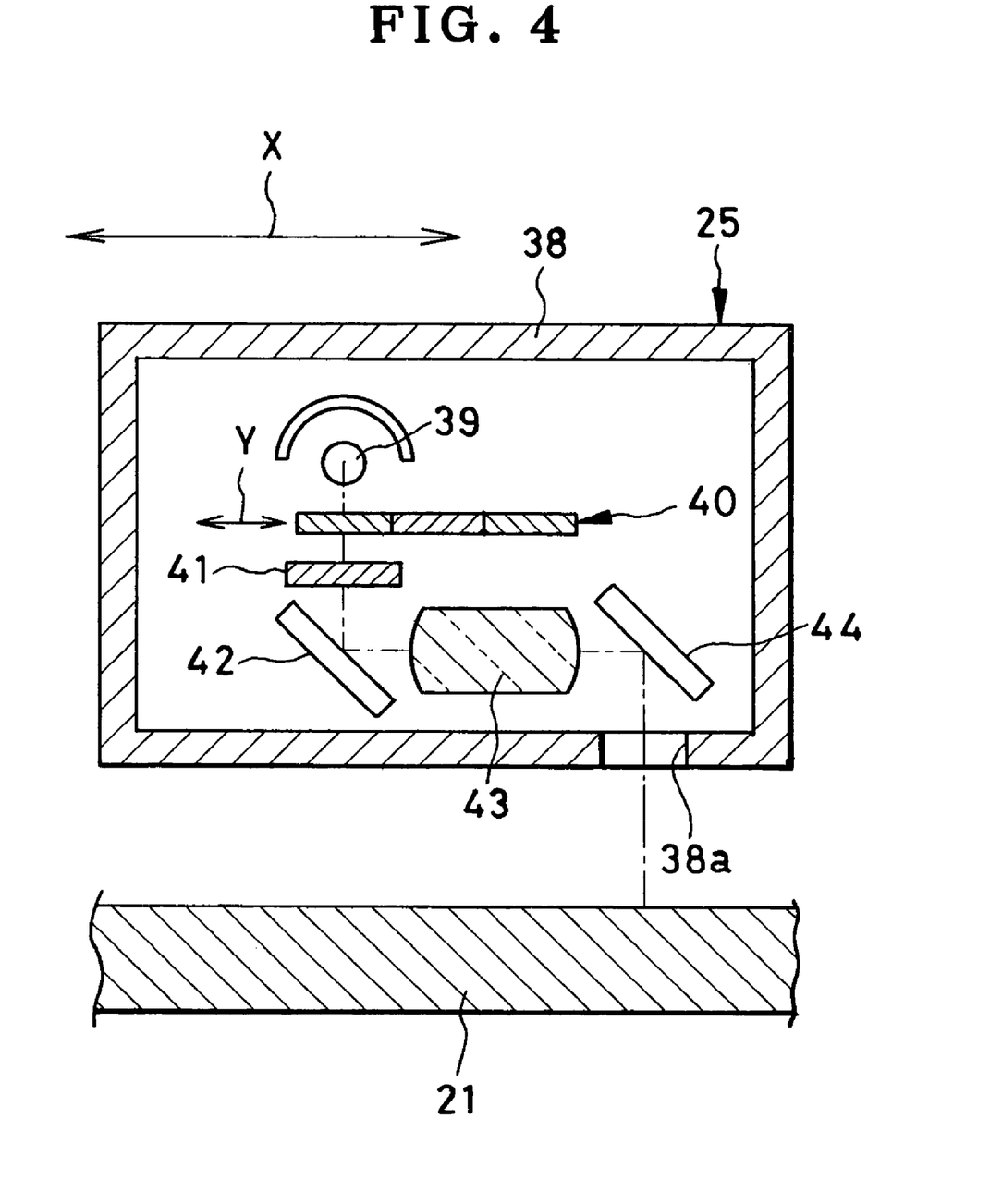
FIG. 4 is an explanatory diagram illustrating an optical printing head of the printer section.

FIG. 4 shows an example of the printing head 25. In a light-tight housing 38 is mounted a fluorescent lamp 39 that is elongated in the lengthwise direction of the printing head 25. Illuminating light from the fluorescent lamp 39 includes light components of red (R), green (G) and blue (B). Instead of the fluorescent lamp 39, another kind of light source may be used insofar as it emits light including those three primary color components.

A color filter 40 is placed in a path of the illuminating light. The color filter 40 consists of a red pass filter portion, a green pass filter portion and a blue pass filter portion, which extend along the fluorescent lamp 39 and are arranged side by side in a perpendicular direction Y to the fluorescent lamp 39. Since the printing head 25 and thus the fluorescent lamp 39 extend in the main scan direction, the direction Y corresponds to the sub scan direction. By shifting the color filter 40 in the direction Y in response to a filter switching signal, those filter portions are positioned one by one in the illuminating light path.

Thus, one of the three color components of the illuminating light from the fluorescent lamp 39 that passes through the color filter 40, is directed to an opening 38a of the housing 38 through an LCD array 41, a mirror 42, a micro lens array 43 and a mirror 44, and is projected as printing light of one color onto the instant film sheet 21. The LCD array 41 consists of a plurality of micro liquid crystal segments aligned in a line along the fluorescent lamp 39. One liquid crystal segment corresponds to one pixel of the printed image, and is each individually controlled to block the printing light or change its transparency according to pixel density. The micro lens array 43 consists of an array of micro cylindrical lenses called SELFOC lens (a trade name), that prevents the printing light after passing through the liquid crystal segment from diverging to other pixel areas. The housing 38 is made to be light-tight, so the printing light is projected only through the opening 38a.

The printing head 25 may have another constitution. For example, micro light emitting diodes (LED) of red, green and blue may be used as a light source. In that case, the color filter 40 and the LED array 41 may be omitted. Pixel density may be adjusted by controlling light intensity of the micro LEDs. The micro LEDs of one color are aligned in a line, and are driven sequentially from one color to another for recording a full-color image in the color frame sequential fashion. Alternatively, the three color micro LEDs are driven concurrently to project the printing light of three colors onto the instant film sheet 21. Then, a full-color image is recorded while the printing head 25 moves once in the sub scan direction relative to the instant film sheet 21.

Figure 5:
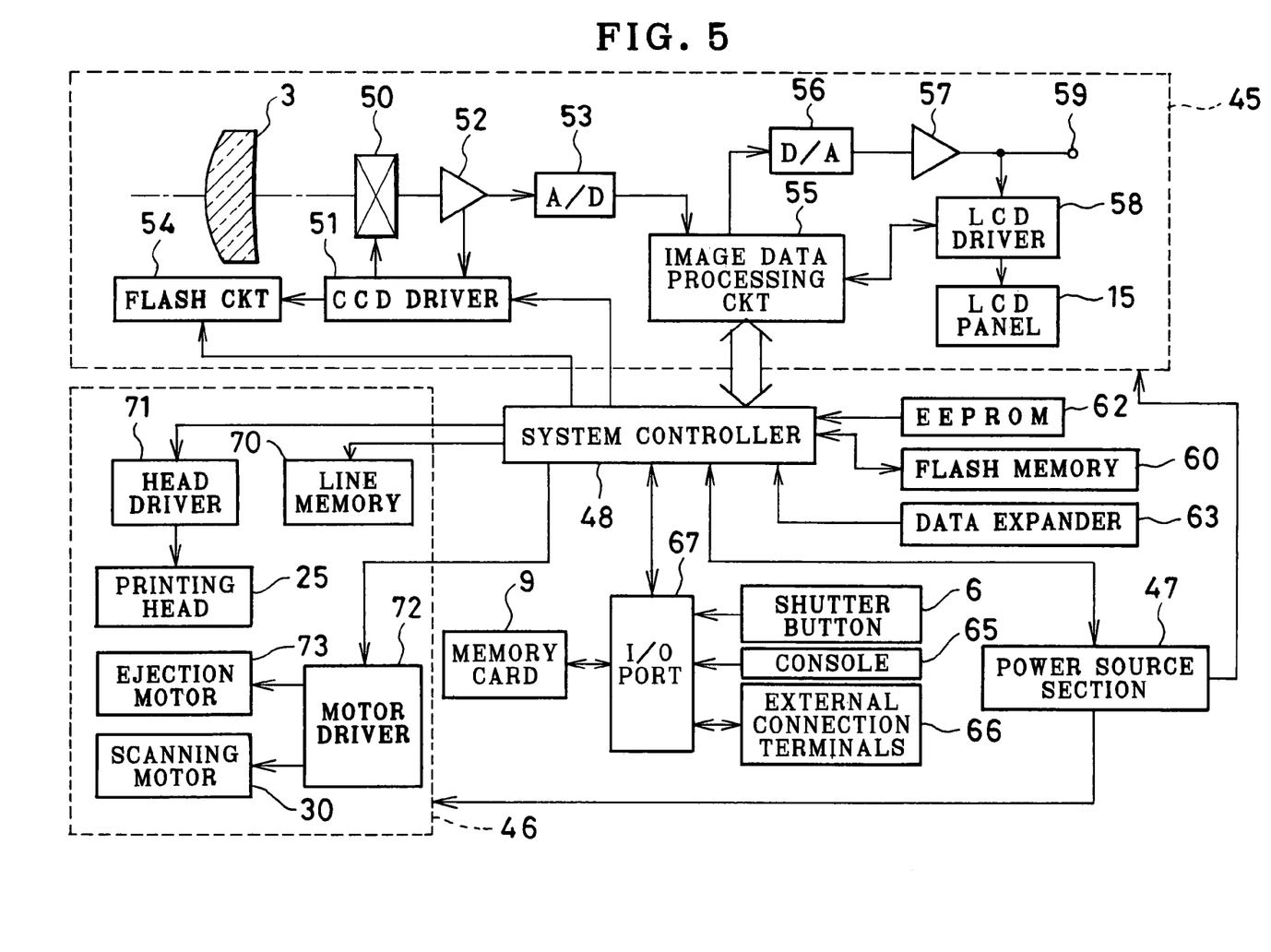
FIG. 5 is a block diagram illustrating a circuitry of the electronic still camera.

FIG. 5 shows the circuitry of the electronic still camera of the present embodiment, wherein the camera section and the printer section are designated by 45 and 46 respectively. All electric components of the camera, including the camera section 45, the printer section 46 and a power source section 47, are controlled by a system controller 48.

A main component of the camera section 45 is a CCD image sensor 50 that is located behind the camera lens 3. By focusing the camera lens 3, a subject image is formed on an opt-electronic conversion surface of the CCD image sensor 50. Micro color filters for red, green and blue are arranged in a matrix on the opt-electronic conversion surface, so an image signal is color-sequentially output from the image sensor 50 as the image sensor 50 is driven by a CCD driver 51. The image signal is amplified to an appropriate level through an amplifier 52, and then converted into digital image data through an A/D converter 53. As well known in the art, the A/D converter 53 samples the image signal in synchronization with the driving timing of the CCD image sensor 50. A flash circuit 54 is activated to project light from the flash window 4 in synchronization with the shutter button 6 being pressed when the brightness of the subject is below a predetermined level. The subject brightness is derived by the system controller 48 from the electric level of the image signal output from the CCD image sensor 50.

The digital image data is sequentially sent to an image data processing circuit 55 for white balance correction, gamma correction, and other processing of the digital image data. The image data processing circuit 55 also produces NTSC composite picture signal from the processed image data, and sends it to an output terminal 59 through a D/A converter 56 and an amplifier 57. By connecting a home TV to the output terminal 59, the home TV can display a series of subject images photographed through the CCD image sensor 50. The picture signal from the amplifier 57 is applied to an LCD driver 58 that drives the LCD panel 15, so the LCD panel 15 displays the moving images of the subject.

The system controller 48 monitors input signals from the shutter button 6, from a console 65, including the multi-operation button 16, the print start button 17, the mode switching dial 18, and the power selection button 19, as well as from external connection terminals 66 through an I/O port 67, to execute an operation program in accordance with the input signals.

The memory card 9 may also be connected to the system controller 48 through the I/O port 67. The memory card 9 is able to store the image data frame by frame, for example, up to 50 frames. The memory card 9 can also store compressed data of a variety of ornamental frames that may be composed with the image data in the image data processing circuit 55, to merge one of the ornamental frame with the subject image.

A flash memory 60 is also able to store the image data frame by frame, for example, up to 50 frames. So the flash memory 60 or the memory card 9 is alternatively used for storing the image data. The photographer may chose the flash memory 60 or the memory card 9 by operating the multi-operation button 16.

A data expander 63 includes a reading circuit for reading out the data from the memory card 9 and a data expanding circuit for expanding the compressed data. In the play mode, the data expander 63 reads and expands the data of the ornamental frame from the memory card 9, and sends it to the image data processing circuit 50, while the image data of a subject read out from the memory card 9 or the flash memory 60 is sent to the image data processing circuit 50. Based on the composed image data, a subject image synthesize with an ornamental frame is displayed on the LCD panel 15.

An EEPROM 62 stores many kinds of adjustment data that is referred to by the system controller 48 for controlling the camera according to a predetermined sequence. The adjustment data is set up for each camera in an inspection process that is executed in the factory at the conclusion of manufacturing the camera. The adjustment data includes data relating to focusing of the camera lens 3, print condition correction data for each color and so forth.

The printer section 46 includes the printing head 25, the scanning motor 30, a line memory 70, a head driver 71, a motor driver 72, and an ejection motor 73. In printing, the image data of one color frame to record presently is read out line by line from the flash memory 60 or from the memory card 9, and the image data of one line is successively written in the line memory 70. The head driver 71 drives the printing head 25 in accordance with the image data of one line under the control of the system controller 48. In this embodiment, the head driver 71 controls the transparency or light transmittance of the individual liquid crystal segments of the LCD array 41 so as to control the intensity of the printing light in accordance with the image data.

Figure 6:
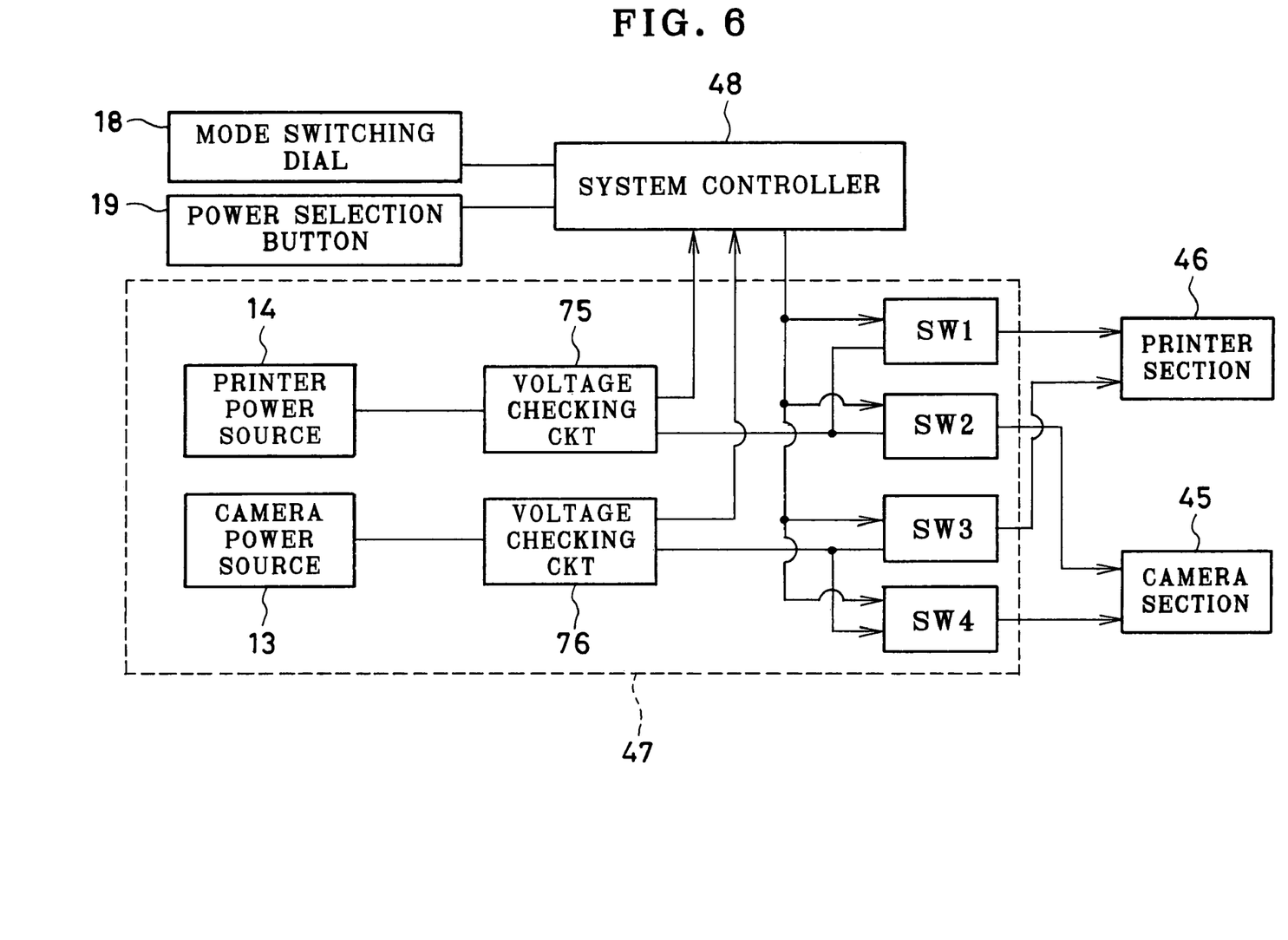
FIG. 6 is a block diagram illustrating a power source section of the electronic still camera.

The power source section 47 has a construction as shown in FIG. 6. The power source section 47 is constituted of the camera power source 13, the printer power source 14, first and second voltage checking circuits 75 and 76, and four switches SW1, SW2, SW3 and SW4. The first voltage checking circuit 75 detects a voltage of the camera power source 13 and sends it to the system controller 48, whereas the second voltage checking circuit 76 detects a voltage of the printer power source 14 and sends it to the system controller 48. If the voltage of either the camera power source 13 or the printer power source 14 goes below a lower limit, the system controller 48 causes the LCD panel 15 to display an indicia alarming that the battery 13 or the batteries 14 are running down.

The switches SW1 to SW4 are constituted of conventional switching transistors. The switches SW1 to SW4 are turned on or off by an ON-OFF control signal that is applied from the system controller 48 in accordance with the input signals from the mode switching dial 18 and the power selection button 19. Turning the switch SW1 on makes the printer power source 14 connected to the printer section 46. Turning the switch SW2 on makes the printer power source 14 connected to the camera section 45. Turning the switch SW3 on makes the camera power source 13 connected to the printer section 46. Turning the switch SW4 on makes the camera power source 13 connected to the camera section 45.

Figure 7:
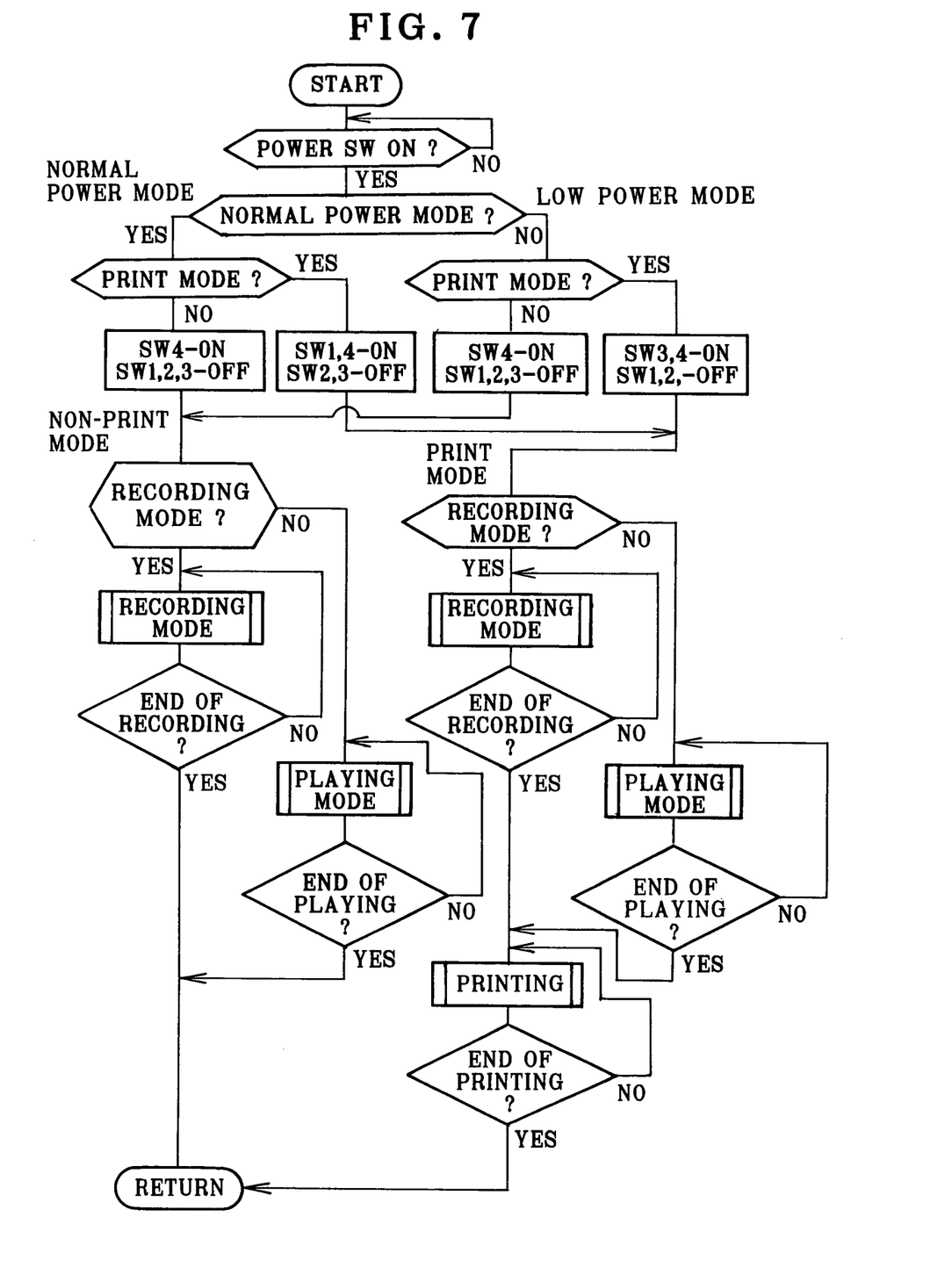
FIG. 7 is a flowchart illustrating an overall operation of the electronic still camera.

Now the operation of the camera configured as above will be described with reference to FIGS. 7 to 9.

When one of the indicia 18b to 18e, excluding the indicia 18a, on the mode switching dial 18 is aligned with the index mark 20, the camera is activated. First, the camera is set to the normal power mode or the low power mode depending upon the switching position of the power selection button 19. Thereafter, in either the normal power mode or the low power mode, the system controller 48 discriminates between a print mode and a non-print mode depending upon the switching position of the mode switching dial 18. That is, the recording-and-printing mode and the playing-and-printing mode are regarded as the print mode. On the other hand, the recording mode and the playing mode are regarded as the non-print mode.

If the non-print mode is selected under the normal power mode, the system controller 48 turns on the switch SW4 alone to connect the camera power source 13 to the camera section 45. If the print mode is selected under the normal power mode, the switches SW1 and SW4 are turned on to connect the printer power source 14 to the printer section 46, and the camera power source 13 to the camera section 45.

If the voltage checking circuit 75 determines that the printer power source 14 has run down in the normal power mode, and the LCD panel 15 displays the corresponding alarming indicia, the photographer may set the camera to the low power mode by operating the power selection button 19. Then, the system controller 48 turns on the switch SW4 to connect the camera power source 13 to the camera section 45. If the print mode is selected under the low power mode, the system controller 48 turns on the switch SW3 to connect the camera power source 13 to the printer section 46, while maintaining the switch SW4 on to keep connecting the camera power source 13 to the camera section 45.

It is also possible to automatically switch the camera 2 to the low power mode and connect the camera power source 13 to the camera section 45 and the printer section 46 when the printer power source 14 has run down in the print mode.

If the voltage checking circuit 76 determines that the camera power source 13 has run down in the normal power mode, the system controller 48 automatically turns on the switch SW2 to connect the printer power source 14 to the camera section 45, and also causes the LCD panel 15 to display the indicia alarming that the camera power source 13 has run down.

Since the printer section 46 is normally supplied from the printer power source 14 with a large capacity, it is possible to supply the camera section 45 stably for a long time from the camera power source 13, even though the printer section 46 consumes a large amount of electric power compared to the camera section 45. Because it is possible to connect the camera power source 13 to the printer section 46 by selecting the low power mode when the voltage of the printer power source 14 goes below the required level, the camera power source 13 doubles as a subsidiary power source for the printer section 46.

Since the batteries for the printer power source 14 and the battery for the camera power source 13 are of AA type, and compatible with each other, it is possible to use one of the batteries of the printer power source 14 for the camera power source 13 when the primary battery used as the camera power source 13 has run down. Even under this condition, if only the photographer selects the low power mode, it is possible to use the printer section 46 as well as the camera section 45. By using rechargeable secondary batteries for the printer power source 14, the photographer does not need to purchase new batteries frequently, and the waste of batteries is reduced.

In some cases, the printer section 46 needs such a large amount of electric power for activation, that four AA type batteries cannot supply the requisite amount of power to the printer section 46. To solve this problem, it is possible to connect the battery of the camera power source 13 to the printer section 46 in addition to the four batteries of the printer power source 14 when the print mode is selected under the normal power mode, by turning on the switch SW3 as well as the switches SW1 and SW4.

After being powered, the system controller 48 starts the designated operation regardless of whether it is the normal power mode or the lower power mode. In the recording-and-printing mode or the playing-and-printing mode, the camera section 45 is controlled to make a recording process or a playing process, while the printer section 46 is put in a standby stage. In the non-print mode, the printer section 46 is deactivated.

Figure 8:
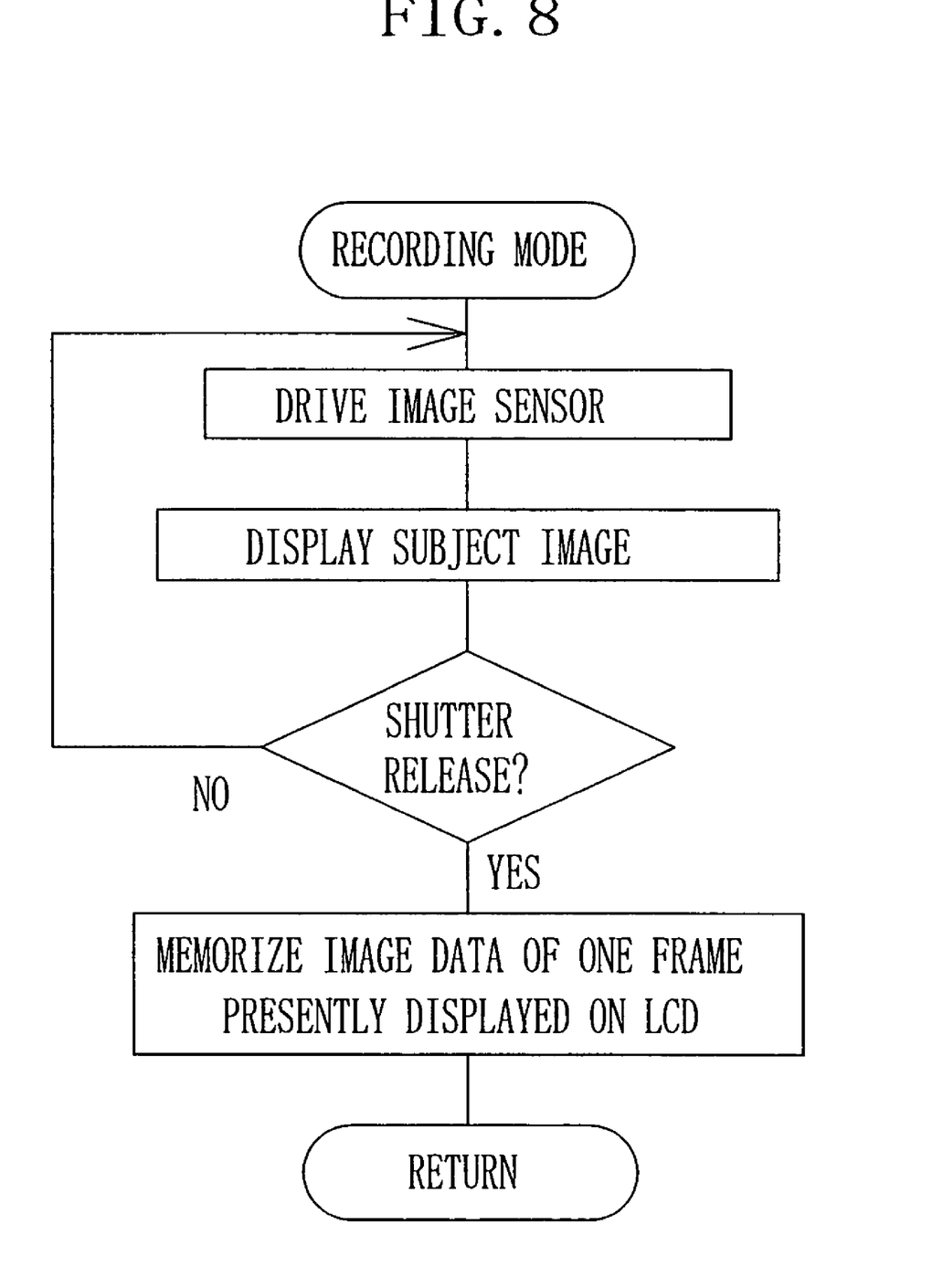
FIG. 8 is a flowchart illustrating an operation sequence of a recording mode.

In the recording mode, the CCD image sensor 50 continuously images subjects, so images of the subjects are displayed on the LCD panel 15, as shown in FIG. 8. Each time the photographer presses the shutter button 6, image data of one image frame displayed on the LCD panel 15 at that moment is written on the memory card 9. It is possible to write the image data on the flash memory 60 or an external memory as connected through the external connection terminal 58, or exchange the image data between the memory card 9, the flash memory 60 and the external memory, by operating the multi-operation button 16.

Figure 9:
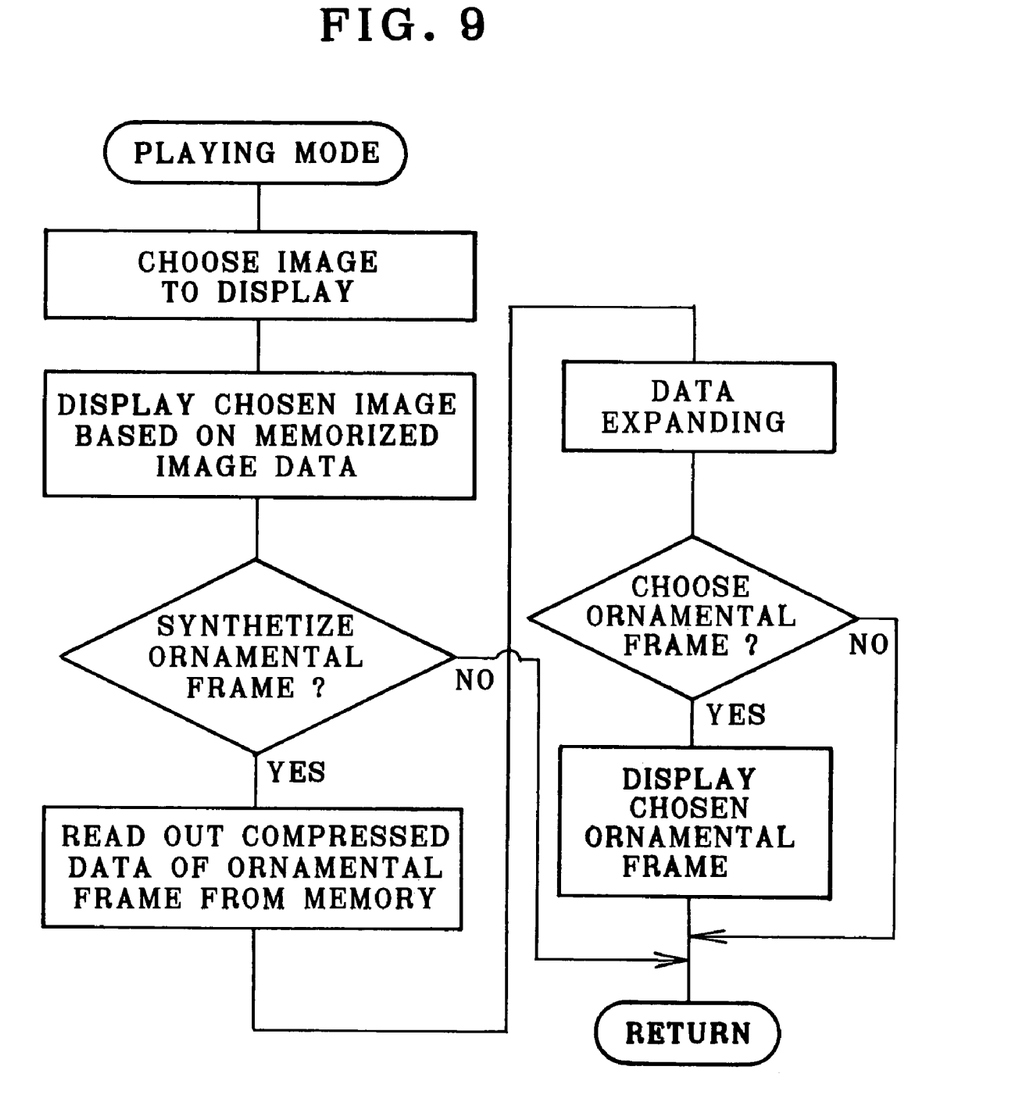
FIG. 9 is a flowchart illustrating an operation sequence of a playing mode.

In the playing mode, as shown in FIG. 9, an appropriate one of the image frames recorded in the memory card 9 or another memory device is selected by operating the multi-operation button 16. Then, the image data of that image frame is supplied to the LCD driver 58 through the image data processing circuit 55, the D/A converter 56 and the amplifier 52, so the image frame is displayed as a still image on the LCD panel 15.

If it is designed to synthesize an ornamental frame with the image by operating the multi-operation button 16, the compressed image data of the ornamental frames is read out from the memory card 9, and is sent to the LCD driver 58 after being expanded in the data expander 62, so the ornamental frames are displayed on the LCD panel 15. By choosing one of the ornamental frames through the console 65, the image data of the chosen ornamental frame is transferred to the image data processing circuit 55, and is composed with the subject image data. Thus, a synthetic still image of the subject with the ornamental frame is displayed on the LCD panel 15.

In the recording-and-printing mode, the LCD panel 15 displays the image frame as the still image for a moment after the image frame is recorded, so it is possible to make a hard copy of the still image by operating the print start button 17. In the playing-and-printing mode, a hard copy of the still image displayed on the LCD panel 15 on the basis of the image data read out from the memory card 9 or another memory device may be printed out by operating the print start button 17.

Upon an input signal from the print start button 17, the system controller 48 starts transferring red frame data of the displayed image one line after another to the line memory 70. After confirming that the red pass filter portion of the color filter 36 is inserted into the printing light path and that all the liquid crystal segments of the LCD array 41 are in their light-shielding condition, the system controller 48 turns on the fluorescent lamp 39.

After confirming that the printing head 25 is in the first terminal position as shown by phantom lines in FIG. 3 through a not-shown sensor, the system controller 48 starts transferring the red image data of the first line from the line memory 70 to the LCD array 41, the individual crystal segments of the LCD array 41 change their transmittance according to the corresponding image data, and then return to the light-shielding condition in a predetermined time.

The red printing light from the red pass filter portion of the color filter 40 travels through the respective liquid crystal segments, so the instant film sheet 21 is exposed to the red printing light beams of different amounts corresponding to the difference in the transmittance of the liquid crystal segments. It is to be noted that it will save time for printing one line when the image data of one line is concurrently transferred from the line memory 64 to the respective segments of the LCD array 41, to change the transmittance of the respective segment all at once.

At the conclusion of exposure to the red light beams for the first line, the scanning motor 24a rotates through a predetermined angle, shifting the printing head 32 to a position of a next line. Thereafter, red image data representative of pixel densities of the second line is transferred to the line memory 70, so the second line of the red frame is photographed on the instant film sheet 21 in the same way as for the first line. In this way, the red frame is photographed line after line on the instant film sheet 21.

After the exposure to the red printing light is completed, the system controller 55 sends the filter switching signal to the head driver 71, so the head driver 71 slides the color filter 40 in the direction Y by an amount to position the green pass filter portion in the printing light path. The system controller 48 then transfers green frame data of the image to print to the line memory 70 sequentially from the last line to the first line, while the printing head 25 is moved from the second terminal position to the first terminal position in synchronism with the driving timing of the LCD array 41. After the completion of recording the green frame on the instant film sheet 21, the blue pass filter portion of the color filter 40 is inserted in the printing light path, and a blue frame of the image to print is recorded line by line on the instant film sheet 21 in the same way as for the red frame, while the printing head 25 is moved from the second terminal position to the first terminal position.

After the three color frames are recorded in this way, the system controller 48 starts driving the ejection motor 73 through the motor driver 72. Then, the exposed instant film sheet 21 is ejected out through the film ejection slot 11 by the claw member 33 and the film processing rollers 22 in a conventional manner. In a few minutes after the ejection, the image recorded on the instant photo film 21 is developed into a positive image.

Although the printer power source 14 is accommodated in the grip 5 that is formed integrally with the camera body 2, it is possible to hold the printer power source 14 in a housing that is removable from the camera body. In that case, the printer power source 14 is connected to the circuit inside the camera body through external contact members by attaching the housing to the camera body. According to this embodiment, the camera may be made more compact when it is used only for photographing. By preparing at least a spare housing for the printer power source, replacement of the printer power source with a new one can be achieved quickly. So it is possible to print a lot of images continuously.

Although the switches SW1 to SW4 are turned on and off by the system controller 48 in the above embodiment, it is possible to make the switches SW1 to SW4 actuated through a mechanism that is interconnected with a manual operation member for selecting the operation mode and the power mode.

Although the present invention has been described with respect to the embodiment where the printer section of the camera makes a hard copy of an image by exposing an instant film sheet through a linear optical printing head that is driven in accordance with image data of the image, the present invention is applicable to an electronic still camera with a printer section of any kind, such as a thermosensitive type printer, a thermal transfer printer, an ink jet printer and so forth.

Thus, the present invention is not to be limited to the above embodiments but, on the contrary, various modifications will be possible for those skilled in the art without departing from the scope of the invention as defined in the appended claims.

What is claimed is:

1. An electronic still camera comprising:
   a camera section for photographing a subject as an electronic image through an image sensor and recording the electronic image as digital image data in a memory;
   a printer section for printing an image of the subject on a recording material based on the digital image data; and
   a power source section comprising a first power source for supplying the camera section and a second power source for supplying the printer section separately from each other,
   wherein the first power source and the second power source are disposed in separate housings,
   wherein the recording material is a photographic material, and
   wherein the printer section comprises a printing head that projects light onto the photographic material across a line in accordance with the image data while moving relative to the photographic material.

2. An electronic still camera as claimed in claim 1, wherein the second power source is accommodated in a housing that is attached to a camera body in a removable fashion.

3. The electronic still camera of claim 1, wherein the first power source comprises a first battery and the second power source comprises a second battery.

4. The electronic still camera of claim 1, wherein the first power source is the primary source of power for the camera section and the second power source is the primary source of power for the printer section.

5. An electronic still camera comprising:
   a camera section for photographing a subject as an electronic image through an image sensor and recording the electronic image as digital image data in a memory;
   a printer section for printing an image of the subject on a recording material based on the digital image data;
   a power source section comprising a first power source for supplying the camera section and a second power source for supplying the printer section separately from each other; and
   a switching device for connecting the second power source to the camera section in order to supply power to the camera section, and for connecting the first power source to the printer section in order to supply power to the printer section, wherein the first power source and the second power source are disposed in separate housings.

6. An electronic still camera as claimed in claim 5, wherein the second power source has a larger capacity than the first power source.

7. An electronic still camera as claimed in claim 6, wherein the second power source is constituted of secondary batteries.

8. An electronic still camera as claimed in claim 6, wherein the second power source is constituted of batteries of a type that is compatible with a battery for the first power source.

9. An electronic still camera as claimed in claim 5, wherein the switching device is controlled depending upon input signals entered through external operation.

10. An electronic still camera comprising:

a camera section for photographing a subject as an electronic image through an image sensor and recording the electronic image as digital image data in a memory;

a printer section for printing an image of the subject on a recording material based on the digital image data;

a power source section comprising a first power source for supplying the camera section and a second power source for supplying the printer section separately from each other;

a switching device for connecting the second power source to the camera section, and for connecting the first power source to the printer section; and a device for checking respective voltages of the first and second power sources, and outputting a signal when the voltage of the first or the second power source goes below a respective lower limit, wherein the switching device connects, in response to the signal from the checking device, one of the power sources whose voltage is still above the lower limit to the camera section and the printer section.

11. An electronic still camera comprising:

a camera section for photographing a subject as an electronic image through an image sensor and recording the electronic image as digital image data in a memory;

a printer section for printing an image of the subject on a recording material based on the digital image data; and a power source section comprising a first power source for supplying the camera section and a second power source for supplying the printer section separately from each other, wherein the first power source and the second power source are disposed in separate housings, and wherein the printer is incorporated into the camera housing.

* * * * *